(12) United States Patent
LaRosa et al.

(10) Patent No.: US 10,793,444 B2
(45) Date of Patent: Oct. 6, 2020

(54) METHODS AND COMPOSITIONS FOR BAUXITE BENEFICIATION

(71) Applicant: Ecolab USA Inc., St. Paul, MN (US)

(72) Inventors: Michael Ignazio LaRosa, Palacios, TX (US); Christopher Ryan Greulich, Aurora, IL (US); Michael Gary Strominger, Naperville, IL (US)

(73) Assignee: Ecolab USA Inc., St. Paul, MN (US)

( * ) Notice: Subject to any disclaimer, the term of this patent is extended or adjusted under 35 U.S.C. 154(b) by 36 days.

(21) Appl. No.: 16/141,290

(22) Filed: Sep. 25, 2018

(65) Prior Publication Data

US 2019/0092646 A1    Mar. 28, 2019

Related U.S. Application Data

(60) Provisional application No. 62/563,328, filed on Sep. 26, 2017, provisional application No. 62/735,543, filed on Sep. 24, 2018.

(51) Int. Cl.
*C01F 7/06* (2006.01)
*C22B 21/00* (2006.01)
(Continued)

(52) U.S. Cl.
CPC .......... *C01F 7/0613* (2013.01); *C01F 7/0633* (2013.01); *C22B 1/00* (2013.01); *C22B 21/0007* (2013.01); *B01D 21/267* (2013.01)

(58) Field of Classification Search
CPC ...... C22B 1/00; C22B 21/0007; C01F 7/0633
See application file for complete search history.

(56) References Cited

U.S. PATENT DOCUMENTS 4,560,541 A    12/1985  Davis
4,578,255 A     3/1986  Roe et al.
(Continued)

FOREIGN PATENT DOCUMENTS

AU     526786 B2    2/1983
CA     988225 A     4/1976
(Continued)

OTHER PUBLICATIONS

Vadim Smirnov, "Alumina Production in Russia Part I", retrieved from http://www.tms.org/pubs/journals/jom/9608/smirnov9608.html, accessed on May 10, 2017, Journal of Minerals, 48(8), 1996, pp. 24-26.
(Continued)

*Primary Examiner* — Melissa S Swain
(74) *Attorney, Agent, or Firm* — Kagan Binder, PLLC

(57) ABSTRACT

Disclosed herein are methods and compositions for increasing the alumina content of a bauxite ore prior to alumina extraction by an extractive process, such as the Bayer process. By adding a beneficiation agent to an aqueous ore slurry, then applying a gravitational force to separate, or partition, the slurry into a beneficiary and a gangue, a number of quantifiable benefits are observed. These include increased alumina content and reduced silica content in the beneficiary solids as compared to the starting ore. These benefits are in excess of those observed by pre-extraction gravitational separation of ore slurries without the addition of a beneficiation agent. Beneficiation agents include DADMAC polymers, and combinations of DADMAC polymers with dextrans. The beneficiary is collected and applied to an extractive process, such as the Bayer process.

20 Claims, 3 Drawing Sheets

(51) Int. Cl.
*C22B 1/00* (2006.01)
*B01D 21/26* (2006.01)

(56) References Cited

U.S. PATENT DOCUMENTS

| | | | |
|---|---|---|---|
| 4,971,685 A | 11/1990 | Stanley et al. | |
| 5,041,269 A | 8/1991 | Moody et al. | |
| 5,049,612 A | 9/1991 | Bulatovic et al. | |
| 5,106,599 A | 4/1992 | Roe | |
| 5,217,620 A | 6/1993 | Mahoney et al. | |
| 5,284,634 A | 2/1994 | Strominger et al. | |
| 5,476,522 A * | 12/1995 | Kerr | B01D 21/01 446/26 |
| 6,527,959 B1 | 3/2003 | Quadir et al. | |
| 6,726,845 B1 | 4/2004 | Barham et al. | |
| 8,349,188 B2 * | 1/2013 | Soane | C02F 1/56 210/666 |
| 9,199,855 B2 | 12/2015 | Urbani et al. | |
| 2008/0107578 A1 * | 5/2008 | Wang | C01F 7/148 423/122 |
| 2014/0110621 A1 | 4/2014 | Kerns et al. | |

FOREIGN PATENT DOCUMENTS

| | | |
|---|---|---|
| CN | 1947850 A | 4/2007 |
| CN | 101249475 A | 8/2008 |
| CN | 101913615 B | 12/2010 |
| EP | 1157727 A1 | 11/2001 |
| WO | 90/09349 A1 | 8/1990 |
| WO | 2017/062200 A1 | 4/2017 |
| WO | 2018/045025 A1 | 3/2018 |

OTHER PUBLICATIONS

Buntenbach et al., "Beneficiation of Bauxite—Upgrading of Recoverable Al2O3", AKW Apparate+Verfahren GmbH, Germany, 6 pages, International Committee for Study of Bauxite, Alumina & Aluminium 2010.

Massola et el., "Separation of silica from bauxite via froth flotation", Mineral Engineering, vol. 22, Issue 4, Mar. 2009, pp. 315-318.

International Search Report for International Application No. PCT/US2018/052616, dated Jan. 4, 2019, 6 pages.

Written Opinion for International Application No. PCT/US2018/052616, dated Jan. 4, 2019, 9 pages.

Liu et al., "The role of cationic polyacrylamide in the reverse flotation of diasporic bauxite", Mineral Engineering, vol. 20, 2007, pp. 1191-1199.

International Search Report for International Application No. PCT/US2019/052554, dated Dec. 11, 2019, 6 pages.

Written Opinion for International Application No. PCT/US2019/052554, dated Dec. 11, 2019, 10 pages.

* cited by examiner

METHODS AND COMPOSITIONS FOR BAUXITE BENEFICIATION

BACKGROUND

Industrial mineral treatment processes combine a number of discrete actions to separate desired minerals from raw mined ores by exploiting the differences in physical and chemical properties of the ore components. Bauxite, an alumina-containing ore and the world's principal source of aluminum metal, is employed in one or more extractive processes that result in separation of the desired aluminum species from the surrounding rock matrix. One such extractive process is the Bayer process for chemical extraction of alumina from a bauxite ore by digestion of the ore in caustic followed by separation of dissolved aluminate species. Autoclaving and sintering extractions are described in Smirnov, V., JOM 48(8), 24-46 (1996).

In some cases, prior to extractive processing, an ore is subjected to one or more processes designed to physically separate an ore product enriched in alumina from an ore product depleted in alumina. An example of pre-extraction processing may be referred to as "beneficiation". The ore product enriched in alumina may be referred to as the "beneficiary." The beneficiary is applied to extractive processing, with the result that the efficiency of the extraction process is increased compared to the use of ores without such pre-extraction processing. The ore product depleted in alumina from such pre-extraction processes may be referred to as "gangue". The gangue may be discarded or subjected to further pre-extraction processing to further separate and obtain additional beneficiary to pass on to extraction.

Desirably, a bauxite beneficiary applied to extractive processing has an extractable alumina content of at least about 40% by weight, more desirably in excess of 45% by weight, and even more desirably about 50% or more by weight upon entering the extractive process. Extractable alumina is the theoretical yield of alumina obtained from the beneficiary upon subjecting it to the selected extractive process.

Desirably, the weight ratio of alumina:silica in the beneficiary is at least about 7, more desirably about 10 or greater upon entering an extraction process. And a beneficiary entering an extraction process desirably includes 3% or less by weight of kaolinite, more desirably 2% or less by weight, and even more desirably about 1.5% by weight or less of kaolinite. Kaolinite, also called "reactive silica" is a particularly problematic component when carried forward into the Bayer extractive process because it consumes the caustic employed during the Bayer process, thereby necessitating the use of excess amount of the chemical in order to digest and separate this impurity from the alumina product. Reduction in the amount of kaolinite present in a beneficiary thus provides a greater advantage for beneficiaries subsequently entering the Bayer process than simply increasing the weight ratio of alumina therein, because the amount of caustic required in subsequent extraction is also reduced. Energy and maintenance costs associated with treatment and removal of kaolinite reaction products are reduced.

Conventionally, a useful method of pre-extractive processing includes comminution of ore, followed by screening to classify the ore particulate into "fines" and larger particles that require further comminution. The fines are slurried with water and the slurry applied to one or more gravitational separation apparatuses to provide a first underflow that includes particulates having a reduced amount of kaolinite and/or increased amount of alumina. The resulting beneficiary is applied as the starting material in an extractive process. Gravitational separation processes employed in the industry include hydrocycloning and centrifuging (applied central force, thus >1 g) as well as settling and countercurrent flow (no applied force; thus about 1 g).

While the use of hydrocyclones and countercurrent flows provides modest observed improvement in the reduction of kaolinite, there has been a paucity of pre-extractive treatment materials and methods for improving on the "quality" of beneficiaries applied to one or more subsequent extractive processes. Further, there is a present trend and additional desire in the industry to use lower grade bauxite ores, which typically have high kaolinite content, low alumina:silica weight ratio, low extractable or available alumina content, or two or more thereof. In such cases, conventional pre-extractive processing may be insufficient to provide an economically satisfactory quality beneficiary for extraction. For example, a low grade bauxite ore may have an alumina:silica ratio as low as about 2 and kaolinite content as high as 15 wt %. Conventional bauxite beneficiation methods such as those described above may be incapable of producing a beneficiary containing 3 wt % kaolinite or less and/or an alumina:silica ratio of 10 or greater when starting from such ore sources.

The industry lacks technically and economically viable solutions for addressing low grade ores to sufficiently increase the weight ratio of alumina in a beneficiary prior to extractive processing thereof to provide an economically feasible process overall. Further, the industry lacks technically and economically viable solutions for increasing the alumina:silica ratio in a beneficiary formed from low-grade ore. In particular, the industry lacks technically and economically viable methods for reducing or removing high concentrations of kaolinite prior to entry of an ore product into the Bayer process.

Thus, there is a need in the industry to increase the weight percent of alumina in a bauxite ore prior to subjecting the ore to an extractive process. There is a need in the industry to increase the weight percent of extractable alumina in a bauxite ore prior to subjecting the ore to an extractive process. There is a need in the industry to increase the alumina:silica weight ratio of a bauxite ore prior to subjecting the ore to an extractive process. There is a need in the industry to reduce the weight percent of kaolinite contained in a bauxite ore prior to subjecting the ore to an extractive process. There is a need in the industry to reduce the amount of caustic required during Bayer processing. There is a need in the industry to maximize the utility of bauxite reserves globally. And there is a need in the industry to minimize degradation and/or loss of alumina product during beneficiation. Finally, there is a need to accomplish all of these goals while also using apparatuses already in use in the alumina ore processing industry, in order to avoid undue complication and cost to operators wishing to obtain these benefits.

The foregoing needs are addressed by the compositions and methods described herein.

SUMMARY OF THE INVENTION

Figure 1:
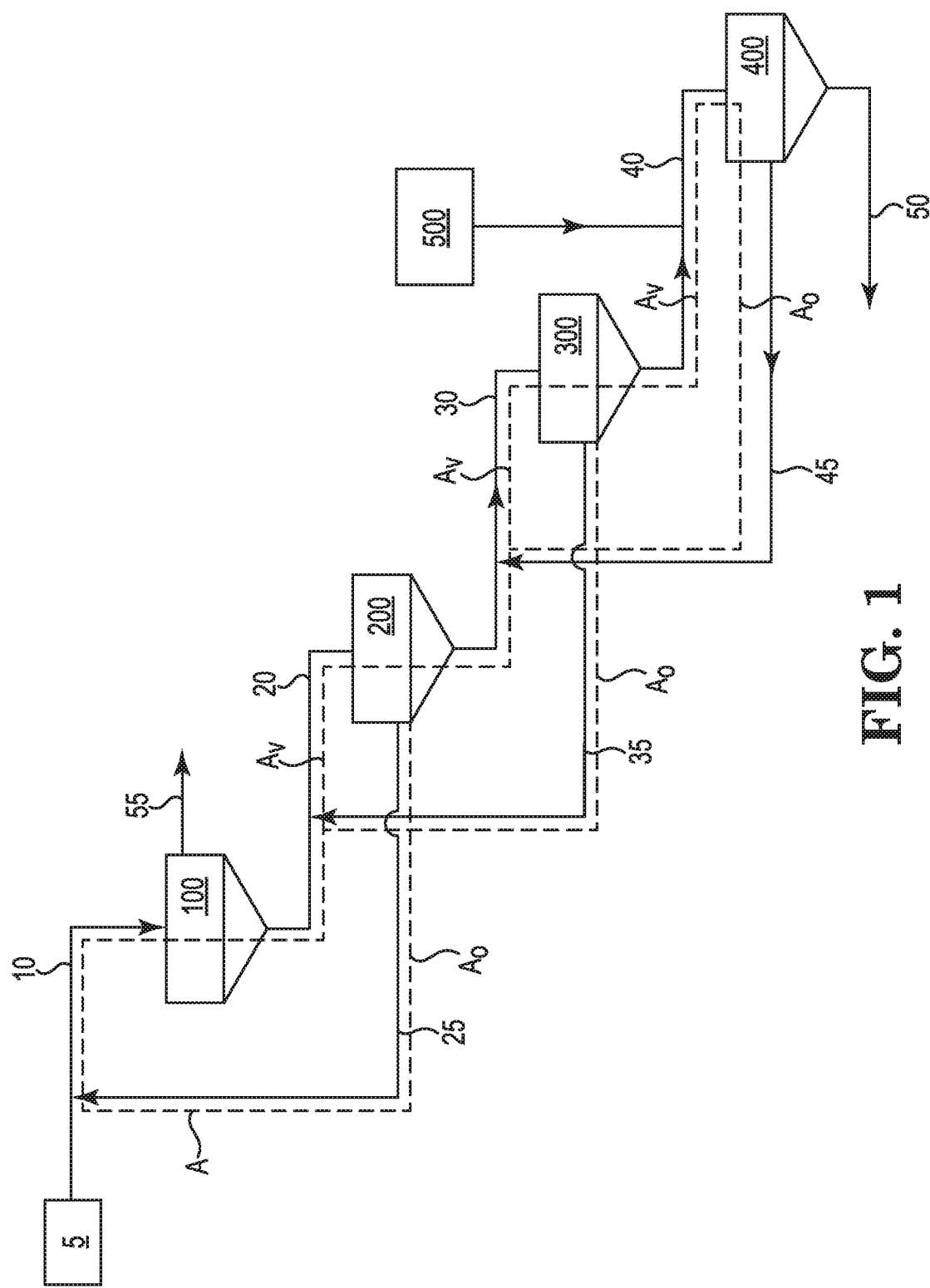
FIG. 1 is a schematic diagram of a countercurrent flow separation or partitioning apparatus.

Accordingly, disclosed herein are methods of bauxite ore beneficiation, the methods comprising: combining an ore source, a water source, and a beneficiation agent to form a first beneficiation slurry; applying a first gravitational force to the first beneficiation slurry to partition the slurry into a first beneficiary and a first gangue; and collecting the first beneficiary, wherein the beneficiation agent comprises a cationic polymer. In embodiments, the method further includes collecting the beneficiary, and one or more of: flocculating the beneficiary, drying the beneficiary, and applying the beneficiary to an extractive process.

The beneficiation agent comprises, consists essentially of, or consists of a cationic polymer. As used herein, the term "cationic polymer" means a polymerized compound having two or more repeat units covalently bonded to each other, further wherein at least one of the repeat units includes a cationic moiety covalently bonded thereto. The cationic polymer is synthetic, or derived from natural sources, or is a synthetically modified polymer derived from natural sources. In embodiments, the cationic moiety is amine or ammonium. The cationic polymer may also include anionic moieties, such as carboxylate or sulfonate moieties covalently bonded thereto, as long as the number of amino or cationic moieties covalently bonded to the polymer is greater than the number of anionic moieties covalently bonded to the polymer. Stated differently, the net ionic charge of all ionic moieties covalently bonded to the cationic polymer must be +1 or greater. In some embodiments, the cationic polymer is crosslinked. In some embodiments, the cationic polymer is a combination of two or more different cationic polymers.

In embodiments, the beneficiation agent further comprises a second polymer, wherein the second polymer is a polysaccharide. Suitable polysaccharides include dextran, chitosan, guar, carrageenan, xanthan, cellulose, pullulan, xanthan, alginate, and various plant-based starches; chemically modified (functionalized) versions of these; crosslinked versions of any of the foregoing; and combinations of any of the foregoing. The polysaccharide is initially sourced from plant or animal products, and used as provided or after chemical modification or crosslinking. In some embodiments the polysaccharide is also characterized as a cationic polymer, for example in the case of chitosan. In embodiments where the beneficiation agent comprises a second polymer, the weight ratio of cationic polymer to polysaccharide in the beneficiation agent is about 1000:1 to 1:100.

In embodiments, the beneficiation agent is added in amount corresponding to about 0.01 gram to 10 grams beneficiation agent per kg of the ore source. In embodiments, the ore source is a comminuted ore source or a classified ore source. In embodiments, the ore source includes less than 40 wt % extractable alumina. In embodiments, the ore source includes more than 3 wt % kaolinite.

In embodiments, the first gravitational force is an applied central force, wherein the method comprises applying the first beneficiation slurry to a first hydrocyclone or a first centrifuge. In embodiments, the first central force is about 1.1 g to 1000 g (1 g=9.8 meters per second per second). In some such embodiments, a first beneficiation slurry is applied to a first hydrocyclone, wherein the first beneficiation slurry is partitioned to result in a first beneficiary which is a first underflow, and a first gangue which is a first overflow.

In other embodiments, the first gravitational force is about 1 g, and the method comprises applying the first beneficiation slurry to a first settler or a first countercurrent flow. In embodiments, the first gravitational force is about 1 g, wherein a first beneficiation slurry is applied to a first countercurrent flow, wherein the first beneficiation slurry is partitioned to result in a first beneficiary which is a first underflow, and a first gangue which is a first overflow.

In any of the foregoing embodiments, the method further comprises applying a first gangue to a second gravitational force to obtain a second beneficiary and a second gangue; and one or more additional such steps without limitation. In embodiments, a second (third, fourth, etc.) beneficiary is combined with a first beneficiary. In embodiments, the combined first and second beneficiaries are applied to an extractive process. In embodiments, a combined beneficiary includes two or more beneficiaries resulting from two or more gravity partitioning processes; in embodiments, a combined gangue includes two or more gangues resulting from two or more gravity partitioning processes, wherein the two or more gravity partitioning processes are batch type or continuous processes and are the same or different gravity partitioning processes. Addition of beneficiation agent is suitably carried out prior to, during, or between gravity partitioning processes, as selected by the user.

In embodiments, first beneficiary includes about 1 wt % to 10 wt % more total alumina than a product obtained using the same methodology but in the absence of the beneficiation agent. In embodiments, the first beneficiary includes about 3 wt % to 10 wt % more available alumina than a product obtained using the same methodology but in the absence of the beneficiation agent. In embodiments, the first beneficiary includes about 2 wt % to 10 wt % less kaolinite than a product obtained using the same methodology but in the absence of the beneficiation agent. In embodiments, the first beneficiary is applied to a Bayer process.

In embodiments, the applying a central force is applying the first beneficiation slurry to a first hydrocyclone, wherein the first beneficiary is a first underflow, and the first gangue is a first overflow. In embodiments, the methods further comprise applying the first gangue to a second hydrocyclone to obtain a second beneficiary and a second gangue. In embodiments, the second beneficiary is combined with the first beneficiary. In embodiments, the combined first and second beneficiaries are applied to a Bayer process.

Also disclosed herein is the use of a cationic polymer to increase available alumina content and/or extractable alumina content of a bauxite ore source prior to extractive processing. In embodiments, the use includes hydrocyclone partitioning of a bauxite ore slurry comprising a cationic polymer, or countercurrent flow partitioning of a bauxite ore slurry comprising a cationic polymer, or both. In embodiments, the use further comprises the use of a polysaccharide combined with the cationic polymer.

Other objects and features will be in part apparent and in part pointed out hereinafter.

DETAILED DESCRIPTION

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used herein, "ore", "bauxite ore", "ore source" and like terms refer to solid rock materials mined from one or more subterranean excavations, wherein the ore contains at least 10% by weight of alumina, for example about 10 wt % to 50 wt % alumina. The ore is not processed by a extractive process. In embodiments the ore is part of an ore slurry or a beneficiation slurry. In embodiments the ore is "as-mined" ore, which is the solid rock produced by mining operations without further modification. In embodiments the ore is a "comminuted ore", which is the as-mined ore after one or more comminution processes such as milling and grinding. In embodiments the ore is a "classified ore", which is a comminuted ore that is further separated according to particle size, such as by a screening process, further wherein the classification is conducted substantially in the absence of a liquid.

As used herein, the term "ore slurry" and like terms means a combination of water with a comminuted ore or a classified ore, in the absence of or substantially in the absence of a beneficiation agent.

As used herein, the term "cationic polymer" means a polymerized compound having two or more repeat units covalently bonded to each other, further wherein at least one of the repeat units includes a cationic moiety covalently bonded thereto. Stated differently, a cationic polymer includes ionic moieties covalently bonded to the polymer, further wherein the sum of all the bonded ionic moieties in a single polymer chain is +1 or greater (as an average of all polymer chains). The cationic polymer is synthetic, or derived from natural sources, or is a synthetically modified polymer derived from natural sources. In embodiments, the cationic moiety is amine or ammonium. The cationic polymer may also include anionic moieties, such as carboxylate or sulfonate moieties covalently bonded thereto, as long as the number of amino or cationic moieties covalently bonded to the polymer is greater than the number of anionic moieties covalently bonded to the polymer. Stated differently, the net ionic charge of all ionic moieties covalently bonded to the cationic polymer must be +1 or greater. In some embodiments, the cationic polymer is crosslinked. In some embodiments, the cationic polymer is a combination of two or more chemically different cationic polymers; chemical differences include one or more of: molecular weight, an average molecular weight, repeat unit chemistry/structure, degree of branching, degree of crosslinking, net charge of the polymer.

As used herein, "extraction", "extractive process", and like terms refer to one or more processes that chemically separate one or more aluminum species from the surrounding rock matrix of a bauxite ore. The extraction may be physicochemical, electrochemical, or combinations thereof. One physicochemical extractive process is the Bayer process.

As used herein, the term "pre-extraction" and like terms applied to methods and processing steps generally indicates methods and processing steps carried out prior to extraction of a bauxite ore. Pre-extraction processing includes, for example, comminution, classification, and beneficiation.

As used herein, the term "beneficiation" means pre-extractive processing of an ore slurry to obtain a beneficiary. In embodiments, beneficiation includes partitioning. In some embodiments, beneficiation includes collecting a beneficiary, flocculating a beneficiary, drying a beneficiary, one or more additional process steps, or a combination of two or more thereof.

As used herein, the term "beneficiary" means an ore product of one or more beneficiation processes, that is, a partitioned ore product. The beneficiary is a type of ore: the desired aluminum species have not yet been chemically separated from the rock matrix. However, the beneficiary is enriched in alumina species compared to the "as-mined" or, a comminuted ore, or a classified ore. The beneficiary has at least one of the following features or properties, noting that weight percentages refer to percent of solids and not percent of a slurry: the total weight percent of alumina in the beneficiary is greater than the total weight percent of alumina in the ore, including the comminuted and/or classified ore; the weight percent of available or extractable alumina in the beneficiary is greater than the weight percent of available or extractable alumina in the ore, including the comminuted and/or classified ore; the total weight percent of silica in the beneficiary is less than the total weight percent of silica in the ore, including the comminuted and/or classified ore; the weight percent of kaolinite in the beneficiary is less than the weight percent of kaolinite in the ore, including the comminuted and/or classified ore; the weight ratio of total alumina to total silica in the beneficiary is greater than the weight ratio of total alumina to total silica in the ore, including the comminuted and/or classified ore; the weight ratio of available alumina to kaolinite in the beneficiary is greater than the weight ratio of available alumina to kaolinite in the ore, including the comminuted and/or classified ore. In embodiments a beneficiary is suitable for or is subsequently applied to an extractive process. In embodiments the extractive process is a Bayer process. In some embodiments, the beneficiary is included in, or is part of, a slurry. In some embodiments the beneficiary is a flocculated solid obtained from a slurry. In some embodiments the beneficiary is a dewatered solid obtained from a slurry.

As used herein, the term "beneficiation slurry" means a combination of an ore source, a water source, and a beneficiation agent. A beneficiation slurry is formed by combining an ore source, a water source, and a beneficiation agent. A beneficiation agent is used by contacting the beneficiation agent with an ore source, a water source, or an ore slurry, wherein the use aids the gravitational separation of the desired alumina species from the surrounding rock matrix. Gravitational separation of the beneficiation slurry results in formation of a beneficiary and a gangue.

As used herein, the terms "partition", "gravity separation", "separation", or like terms refer to the use of a gravitational force to partition an ore slurry into a beneficiary and a gangue. Gravitational force includes forces based on the constant of proportionality, g, where 1 g is equal to 9.8 meters per second per second, which is approximately the ambient force of gravity at the Earth's surface. In embodiments, the gravitational force is 1 g. In other embodiments, a force is applied to a system, that is, a force in excess of 1 g. In some such embodiments an applied gravitational force is a central force, wherein the separation is a centrifugal separation. Relative centrifugal force is typically expressed in multiples of g. Centrifugal separation includes centrifuge and hydrocyclone separation.

As used herein, the terms "underflow" and "overflow" refer to a partitioned slurry obtained by partitioning an ore slurry and collecting the separated products which consists of an underflow and an overflow. In embodiments an underflow comprises a beneficiary.

As used herein, the terms "comprise(s)," "include(s)," "having," "has," "can," "contain(s)," and variants thereof are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination, side reactions, or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

As used herein, any recited ranges of values contemplate all values within the range and are to be construed as support for claims reciting any sub-ranges having endpoints which are real number values within the recited range. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

Discussion

Described herein are methods of bauxite ore beneficiation, wherein a bauxite ore becomes enriched in alumina prior to chemical extraction of one or more aluminum species from the surrounding rock matrix. The most common bauxite extractive process is the Bayer process. Pre-extraction treatment of ores to enrich the ore in alumina content is referred to herein as "beneficiation" and such pre-extractive processing results in a "beneficiary." Thus, described herein are methods of beneficiation, wherein the methods provide one or more of the following benefits: increased total weight percent of alumina in the beneficiary, increased weight percent of extractable alumina in the beneficiary, decreased total weight of silica in the beneficiary; decreased weight percent of kaolinite in the beneficiary; increased extractable alumina:kaolinite weight ratio in the beneficiary; or increased total alumina:total silica weight ratio in the beneficiary. The benefits are relative to these parameters as measured for the ore as a starting material, the ore after comminuting, the ore after classifying, the ore after ore slurry formation, and/or the ore after ore slurry formation followed by partitioning but excluding the beneficiation agents described below.

The methods comprise forming a beneficiation slurry comprising, consisting essentially of, or consisting of: an ore source, water, and a beneficiation agent; and partitioning the beneficiation slurry to form a beneficiary and a gangue. In embodiments, the method further comprises collecting the beneficiary, followed by flocculating, drying, or both.

The ore source is any solid rock material mined from one or more subterranean excavations and containing at least 10% by weight of alumina. In embodiments the ore source contains about 10 wt % to 90 wt % alumina. The ore source is not processed by a extractive process. In embodiments the ore is "as-mined" ore, which is the rock product produced by mining operations without further modification. In embodiments the ore is a "comminuted ore", which is the as-mined ore after one or more comminution processes such as milling and grinding. In embodiments the ore is a "classified ore", which is a comminuted ore that is further separated according to particle size, such as by a screening process, further wherein the classification is conducted substantially in the absence of a liquid.

Classified ores are the most common type of ore source employed in beneficiation processes. The purpose of classification is to provide a particulate of appropriate size for one or more beneficiation steps. However, the methods described herein are not particularly limited as to particle size range or average particle size of a comminuted ore, and classification is not necessary to obtain the benefits of the presently described methods. Therefore, in some embodiments classification of a comminuted ore is suitably excluded from the methods described.

In embodiments, classification is carried out by contacting a comminuted ore with a screen, such that the ore particles passing through the screen are collected for beneficiation and the larger particulates are subjected to one or more additional comminution steps. In embodiments, the classified ore is classified while substantially dry, that is, in the absence of or substantial absence of liquid water. A common method of classification employed for ores is to pass a comminuted ore through a series of screens of decreasing mesh size, and select one or more captured ore particle size ranges retained by one or more of the screens. In embodiments, screening methods of classification are also employed to determine the average particle size range of a particulate, for example by weighing the fractions of ore particulate retained on the various mesh screens and determining an average particle size based on weight distribution. One or more classified ores are suitably employed in an ore slurry for purposes of beneficiation according to the presently described methods.

In embodiments, an average particle size of a classified ore is between about 150 mm and 0.1 µm, for example about 100 mm to 1 µm, or about 50 mm to 1 µm, or about 30 mm to 1 µm, or about 20 mm to 1 µm, or about 10 mm to 1 µm, or about 50 mm to 10 µm, or about 50 mm to 100 µm, where such values and ranges are dictated by the classification methodology employed. In embodiments, the average particle size is "D50", or d50, or average particle diameter by mass. Where not otherwise specified, the value of D50 particle size is determined by a screening classification method. However, other methods may be used to determine an average particle size, including D50 particle size; such methods include for example light scattering methods or liquid-based size exclusion methods.

An ore source is combined with a water source to form an ore slurry. Generally, the ore slurry includes about 1 wt % to 50 wt % ore, with the balance of the slurry (50 wt % to 99 wt %) being the water source. In embodiments, the ore slurry includes about 5 wt % to 50 wt %, or about 10 wt % to 50 wt %, or about 15 wt % to 50 wt %, or about 20 wt % to 50 wt %, or about 10 wt % to 40 wt %, or about 10 wt % to 30 wt % ore, with the balance being a water source. The water source is water, tap water, fresh water, industrial wastewater from one or more mining operations, or another source.

A beneficiation slurry comprises, consists essentially of, or consists of an ore source, a water source, and a beneficiation agent. In embodiments, an ore source is combined with a beneficiation agent prior to formation of a beneficiation slurry. In embodiments, an ore slurry is combined with a beneficiation agent to form a beneficiation slurry. In embodiments, a water source is mixed with a beneficiation agent, and the mixture is combined with an ore source or an ore slurry to form a beneficiation slurry. A beneficiation slurry comprises, consists essentially of, or consists of an ore source, a water source, and a beneficiation agent. The components of the beneficiation slurry may be added in any order to each other, such order including but not limited to: repeated or continuous additions of any one or more components of the beneficiation slurry in any order within one or more beneficiation processes (for example to adjust concentrations or maintain a continuous process by replenishment) or prior to the beneficiation process (for example by applying a dry powdered beneficiation agent to the ore source); addition of individual beneficiation agent compounds to the components of the beneficiation slurry in any order; and combinations thereof. In embodiments, the total amount of beneficiation agent in the beneficiation slurry is measured and reported based on weight of ore in the slurry. In embodiments, an industrial process involves two or more beneficiation processes wherein two or more beneficiaries are formed from a single beneficiation slurry; or two or more beneficiaries are formed from two or more beneficiation slurries. In some embodiments where two or more beneficiation slurries are formed, two or more discrete aliquots of beneficiation agent are added. Any such processes are suitably batch or continuous processes. In embodiments, an industrial process comprises two or more beneficiation processes wherein two or more beneficiaries are formed from a single beneficiation slurry; or two or more beneficiaries are formed from two or more beneficiation slurries. Where two or more beneficiation slurries are formed, two or more discrete additions of beneficiation agent are suitably employed. Any such processes are suitably batch or continuous processes and are freely combined in any order in a multistage beneficiation.

In embodiments, the beneficiation agent comprises, consists essentially of, or consists of a cationic polymer. In embodiments, the beneficiation agent comprises, consists essentially of, or consists of a polysaccharide. In embodiments, the beneficiation agent comprises, consists essentially of, or consists of a cationic polymer and a polysaccharide. The cationic polymer is a polymer having ionic moieties covalently bonded thereto, wherein the net charge of all ionic moieties is +1 or greater. In some embodiments, the cationic polymer comprises, consists essentially of, or consists of a homopolymer or a copolymer of a monomer bearing a cationic charge covalently bonded thereto. In other embodiments, the cationic polymer comprises, consists essentially of, or consists of a homopolymer or a copolymer of a monomer that is subjected to post-polymerization quaternization of amine-functional residues or repeat units to yield one or more ammonium-functional residues or repeat units. In some embodiments, the cationic monomer is selected from diallyldimethylammonium chloride (DADMAC) and quaternized amino functional acrylates or acrylamides, such as methacrylamidopropyltrimethylammonium chloride or 2-(acryloyloxy)-N,N,N-trimethylethanammonium chloride. In some embodiments, the cationic polymer is characterized by a molecular weight of about 300 g/mol to $1 \times 10^6$ g/mol, when the molecular weight is measured by gel permeation chromatography. In some embodiments, the cationic polymer is characterized by a molecular weight of about 300 g/mol to $1 \times 10^6$ g/mol, when the molecular weight is measured by intrinsic viscosity techniques familiar to those of skill.

In embodiments, the cationic polymer includes one or more anionic monomer residues such as those bearing carboxylate, phosphonate, or sulfonate moieties covalently bonded thereto, wherein the total or net charge of the polymer is +1 or greater. Stated differently, the sum of anionic and cationic moieties bonded to the polymer is +1 or greater. In one or more of the foregoing embodiments, the cationic polymer includes one or more nonionic monomer residues such as those bearing amide, imide, ester, ether, olefinic, or other moieties covalently bonded thereto, wherein the total or net charge of the polymer is +1 or greater.

In some embodiments, the beneficiation agent further comprises a polysaccharide. In some embodiments, the polysaccharide is selected from dextran, chitosan, guar, carrageenan, xanthan, cellulose, pullulan, xanthan, alginate, and various plant-based starches; chemically modified (functionalized) versions of these; crosslinked versions of any of the foregoing. In embodiments the polysaccharide is a mixture of different polysaccharides obtained from different sources and thus have different physicochemical properties such as molecular weight, degree of branching, and the like. In some embodiments, the polysaccharide is a chitosan or a dextran. Dextran is a complex branched glucan (polysaccharide formed from glucose molecules) composed of chains of varying lengths (from 3 to 2000 kilodaltons). The straight chain consists of α-1,6 glycosidic linkages between glucose molecules, while branches begin from α-1,3 linkages. Commercially, dextran is obtained from bacterial processing of sucrose by lactic acid bacteria such as *Leuconostoc mesenteroides* and *Streptococcus mutans*.

In some embodiments, the polysaccharide is crosslinked. In some embodiments, a dextran is a crosslinked dextran. In some embodiments, the polysaccharide is chemically modified by one or more thermochemical reactions such as crosslinking or functionalization, for example carboxymethylation. In some embodiments, the polysaccharide is chemically modified by post-collection enzymatic conversion.

In embodiments, the beneficiation agent comprises, consists essentially of, or consists of a cationic polymer. In embodiments, the beneficiation agent comprises, consists essentially of, or consists of a polysaccharide. In embodiments, the beneficiation agent comprises, consists essentially of, or consists of a cationic polymer and a polysaccharide. In some embodiments, the cationic polymer comprises, consists essentially of, or consists of a homopolymer or a copolymer of a monomer bearing a cationic charge covalently bonded thereto. In other embodiments, the cationic polymer comprises, consists essentially of, or consists of a homopolymer or a copolymer of a monomer that is subjected to post-polymerization quaternization of amine-functional residues or repeat units to yield one or more ammonium-functional residues or repeat units. In some embodiments, the cationic monomer is selected from diallyldimethylammonium chloride (DADMAC) and quaternized amino functional acrylates or acrylamides, such as methacrylamidopropyltrimethylammonium chloride or ethacrylyltrimethylammonium chloride.

Methods of polymerization of such monomers include aqueous solution polymerization and emulsion or latex polymerization employing one or more radical-generating initiators for initiation of the polymerization or copolymerization reaction. Those of skill are familiar with methods to synthetically obtain cationic polymers via polymerization of unsaturated monomers, optionally followed by post-polymerization quaternization, to obtain a polymer bearing a +1 or greater cationic net charge.

In some embodiments, the cationic polymer is characterized by an average molecular weight of about 300 g/mol to $1 \times 10^6$ g/mol, when the molecular weight is measured by gel permeation chromatography. In some embodiments, the cationic polymer is characterized by an average molecular weight of about 300 g/mol to $1 \times 10^6$ g/mol, when the molecular weight is measured by intrinsic viscosity. In some embodiments, the cationic polymer is characterized by a weight average molecular weight of about 300 g/mol to $1 \times 10^6$ g/mol.

In embodiments, the cationic polymer includes one or more anionic monomer residues such as those bearing carboxylate, phosphonate, or sulfonate moieties covalently bonded thereto, wherein the total or net charge of the polymer is +1 or greater. Stated differently, the sum of anionic and cationic moieties bonded to the polymer is +1 or greater. In one or more of such embodiments, the cationic polymer includes one or more nonionic monomer residues such as those bearing amide, imide, ester, ether, olefinic, or other moieties covalently bonded thereto, wherein the total or net charge of the polymer is +1 or greater.

In embodiments, the beneficiation slurry comprises, consists essentially of, or consists of an ore source, a water source, and a polysaccharide. In embodiments, the beneficiation slurry comprises, consists essentially of, or consists of an ore source, a water source, and a cationic polymer and a polysaccharide. In embodiments, the beneficiation slurry comprises, consists essentially of, or consists of an ore source, a water source, and a DADMAC homopolymer or a copolymer thereof. In embodiments, the beneficiation slurry comprises, consists essentially of, or consists of an ore source, a water source, and a DADMAC homopolymer. In embodiments, the beneficiation slurry comprises, consists essentially of, or consists of an ore source, a water source, a DADMAC homopolymer or a copolymer thereof, and a polysaccharide. In embodiments, the beneficiation slurry comprises, consists essentially of, or consists of an ore source, a water source, a DADMAC homopolymer or a copolymer thereof, and a dextran.

In embodiments, the polysaccharide is a chitosan, a dextran, or a carrageenan. The molecular weight of polysaccharides suitably employed in the methods described herein are not particularly limited, and generally are determined by the natural product from which the polymer is obtained. In embodiments, the polysaccharide is crosslinked.

Polysaccharides useful as beneficiation agents either alone or when combined with a cationic polymer generally have an uncrosslinked weight average molecular weight calculated or measured to be about 5,000 g/mol to $1 \times 10^7$ g/mol, for example about 10,000 g/mol to $1 \times 10^6$ g/mol, or about 20,000 g/mol to $1 \times 10^6$ g/mol, or about 30,000 g/mol to $1 \times 10^6$ g/mol, or about 40,000 g/mol to $1 \times 10^6$ g/mol, or about 60,000 g/mol to $1 \times 10^6$ g/mol, or about 80,000 g/mol to $1 \times 10^6$ g/mol, or about 100,000 g/mol to $1 \times 10^6$ g/mol, or about 200,000 g/mol to $1 \times 10^6$ g/mol, or about 300,000 g/mol to $1 \times 10^6$ g/mol, or about 10,000 g/mol to 900,000 g/mol, or about 10,000 g/mol to 800,000 g/mol, or about 10,000 g/mol to 700,000 g/mol, or about 10,000 g/mol to 600,000 g/mol, or about 10,000 g/mol to 500,000 g/mol, or about 10,000 g/mol to 400,000 g/mol, or about 10,000 g/mol to 300,000 g/mol, or about 10,000 g/mol to 200,000 g/mol. In some embodiments the polysaccharide is functionalized, such as by carboxymethylation or acetylation; in some embodiments, the polysaccharide is crosslinked.

In embodiments, the beneficiation agent is added to an ore slurry in an amount corresponding to at least about 10 grams per 1000 kg ore, in embodiments as much as 1 kg per 1000 kg ore, for example about 0.01 gram to 1 gram beneficiation agent per kg ore, or about 0.02 gram to 1 gram, or about 0.03 gram to 1 gram, or about 0.04 gram to 1 gram, or about 0.05 gram to 1 gram, or about 0.06 gram to 1 gram, or about 0.07 gram to 1 gram, or about 0.08 gram to 1 gram, or about 0.09 gram to 1 gram, or about 0.01 gram to 0.9 gram, or about 0.01 gram to 0.8 gram, or about 0.01 gram to 0.7 gram, or about 0.01 gram to 0.6 gram, or about 0.01 gram to 0.5 gram, or about 0.01 gram to 0.4 gram, or about 0.01 gram to 0.3 gram, or about 0.01 gram to 0.2 gram beneficiation agent per kg ore. The beneficiation agent is suitably added to an ore slurry "neat", that is, as a substantially 100% dry powder, and dissolved in the slurry to form a beneficiation slurry. Alternatively, a beneficiation agent solution or dispersion in water is formed, and the solution or dispersion is added to an ore slurry to form a beneficiation slurry. The concentration of such a solution or dispersion is not particularly limited and is adjusted for the ease of use and convenience of the operator in applying the beneficiation agent. However, such concentration may suitably range between about 0.1 gram beneficiation agent per 100 mL water to 100 gram beneficiation agent per 100 mL water.

An ore source, a water source, and a beneficiation agent are combined to form a beneficiation slurry. In embodiments, an ore source is combined with a beneficiation agent prior to formation of a beneficiation slurry. In embodiments, an ore slurry is combined with a beneficiation agent to form a beneficiation slurry. In embodiments, a water source is mixed with a beneficiation agent, and the mixture is combined with an ore source or an ore slurry to form a beneficiation slurry. A beneficiation slurry comprises, consists essentially of, or consists of an ore source, a water source, and a beneficiation agent. The components of the beneficiation slurry may be added in any order to each other, such order including but not limited to: repeated or continuous additions of any one or more components of the beneficiation slurry in any order within one or more beneficiation processes (for example to adjust concentrations or maintain a continuous process) or prior to the beneficiation process (for example by applying the dry powder beneficiation agent to the ore source); addition of beneficiation agent components to the beneficiation slurry components in any order; and combinations thereof.

In embodiments an aqueous solution of the beneficiation agent is formed and the solution is added to the ore or to an ore slurry to form a beneficiation slurry. In embodiments the cationic polymer is added to the slurry and then polysaccharide is added to the slurry; in other embodiments, polysaccharide is added to the slurry and then the cationic polymer is added to the slurry; in still other embodiments, the cationic polymer and the polysaccharide are combined, then added to the slurry contemporaneously; such addition may be a single addition, continuous addition, batchwise addition, and the like.

In embodiments, the total amount of beneficiation agent in the beneficiation slurry is measured based on weight of ore in the slurry. In embodiments, an industrial process involves two or more beneficiation processes wherein two or more beneficiaries are formed from a single beneficiation slurry; or two or more beneficiaries are formed from two or more beneficiation slurries. Where two or more beneficiation slurries are formed, two or more discrete additions of beneficiation agent are suitably employed. Any such processes are suitably batch or continuous processes.

In embodiments where the beneficiation agent comprises, consists essentially of, or consists of a cationic polymer and a polysaccharide, (whether or not these polymers are combined prior to contact with an ore source or with an ore slurry), the weight ratio of the cationic polymer to the polysaccharide is about 1000:1 to 1:100, for example about 1000:1 to 1:10, or about 1000:1 to 1:7, or about 1000:1 to 1:5, or about 1000:1 to 1:3, or about 1000:1 to 1:1, or about 100:1 to 1:100, or about 100:1 to 1:10, or about 100:1 to 1:7, or about 100:1 to 1:5, or about 100:1 to 1:3, or about 100:1 to 1:1, or about 10:1 to 1:100, about 10:1 to 1:10, about 10:1 to 1:7, about 10:1 to 1:5, or about 10:1 to 1:3, or about 10:1 to 1:1, or about 7:1 to 1:7, or about 5:1 to 1:5, about 3:1 to 1:3, or about 1:1 to 1:3.

In embodiments where the beneficiation agent comprises, consists essentially of, or consists of a DADMAC and a dextran (whether or not these compounds are combined prior to contact with an ore source or with an ore slurry), the weight ratio of DADMAC to dextran is about 1000:1 to 1:100, for example about 1000:1 to 1:10, or about 1000:1 to 1:7, or about 1000:1 to 1:5, or about 1000:1 to 1:3, or about 1000:1 to 1:1, or about 100:1 to 1:100, or about 100:1 to 1:10, or about 100:1 to 1:7, or about 100:1 to 1:5, or about 100:1 to 1:3, or about 100:1 to 1:1, or about 10:1 to 1:100, about 10:1 to 1:10, about 10:1 to 1:7, about 10:1 to 1:5, or about 10:1 to 1:3, or about 10:1 to 1:1, or about 7:1 to 1:7, or about 5:1 to 1:5, about 3:1 to 1:3, or about 1:1 to 1:3. The overall amount of dextran is calculated based on the amount of DADMAC added to an ore slurry to form a beneficiation slurry. The amount of DADMAC added to an ore slurry to form a beneficiation slurry is described above.

One conventional method of beneficiation includes comminution of an ore source, followed by classification of the comminuted ore by screening to provide "fines" (particles of a selected average particle size or less) and larger particles that require further comminution. The fines are slurried with water and the slurry is applied to a hydrocyclone (more than 1 g) or a countercurrent flow (1 g) to partition the slurry into an underflow and an overflow. The underflow includes an ore particulate having a reduced amount of kaolinite and/or increased amount of alumina. In embodiments, the overflow includes a reduced size class of particulate termed "superfines", which may be further processed to improve the overall efficiency of hydrocyclone partitioning. In embodiments the underflow is flocculated to reduce water content prior to Bayer processing. The underflow, optionally with reduced water content and optionally further combined with one or more additional ore slurry underflow products, is applied as the starting material in a Bayer process. The Bayer process is familiar to those of skill in the art of alumina ore processing.

Accordingly, a method of beneficiation includes comminution of an ore source, followed by classification of the comminuted ore. In embodiments, classification includes selection of particles having an average size, in a selected dimension, of about 150 mm or less. In embodiments, the particles have an average size of less than 1 µm. Maximum particle size is determined by screen sizing, for example, although another method may be used. The classified ore is combined with a water source and a beneficiation agent to form a beneficiation slurry.

The beneficiation slurry is partitioned, or separated, by a gravitational force to form a beneficiary and a gangue. In embodiments, the gravitational force is 1 g and the gravitational separation is achieved by a countercurrent flow or settler apparatus. In embodiments, the gravitational force is a central force and the gravitational separation is achieved by a hydrocyclone or a centrifuge apparatus. In embodiments, centrifugal separation includes applying a force greater than 1 g to the beneficiation slurry to partition the slurry into a beneficiary and a gangue. In embodiments, centrifugal separation includes centrifuge separation or hydrocyclone separation.

Thus, in embodiments, a beneficiation slurry is partitioned into an underflow and an overflow, wherein the underflow is collected and in embodiments is applied to extractive processing. In embodiments, the beneficiation slurry is applied to a first hydrocyclone to partition the beneficiation slurry into a first underflow and a first overflow. In such embodiments, the first underflow includes a first beneficiary. In some embodiments, the first underflow is flocculated to reduce water content, dried, and applied as the starting material in an extractive process. In embodiments, the first overflow is discarded or further processed. In embodiments the first overflow is or includes a gangue.

In embodiments, partitioning of a beneficiation slurry to form a beneficiary and a gangue is achieved by subjecting the beneficiation slurry to one or more centrifugal separation processes wherein the process includes applying a central force of about 1 g to 2000 g to the beneficiation slurry, for example about 1 g to 1500 g, or about 1 g to 1000 g, or about 1 g to 800 g, or about 1 g to 600 g, or about 1 g to 500 g, or about 1 g to 400 g, or about 1 g to 300 g, or about 1 g to 200 g, or about 1 g to 100 g, or about 1 g to 80 g, or about 1 g to 60 g, or about 1 g to 40 g, or about 1 g to 20 g, or about 1 g to 10 g, or about 2 g to 1000 g, or about 4 g to 1000 g, or about 6 g to 1000 g, or about 8 g to 1000 g, or about 10 g to 1000 g, or about 2 g to 100 g, or about 4 g to 100 g, or about 6 g to 100 g, or about 8 g to 100 g, or about 10 g to 100 g to the beneficiation slurry.

The beneficiation slurry is partitioned, or separated, by a gravitational force to form a beneficiary and a gangue. Gravitational separation includes the use of forces of 1 g or greater. In embodiments, the gravitational force is 1 g and the partitioning is achieved by settling or by countercurrent flow processing. In embodiments, the gravitational force is a central force and the gravitational separation is a centrifugal separation. In embodiments, centrifugal separation includes applying a force greater than 1 g to the beneficiation slurry to partition the slurry into a beneficiary and a gangue. In embodiments, centrifugal separation includes one or more of: centrifuge separation and hydrocyclone separation.

In embodiments, the partitioning of the beneficiation slurry to form the beneficiary and the gangue is achieved by subjecting the beneficiation slurry to one or more centrifugal separation processes wherein the process includes applying a central force of about 1 g to 2000 g to the beneficiation slurry, for example about 1 g to 1500 g, or about 1 g to 1000 g, or about 1 g to 800 g, or about 1 g to 600 g, or about 1 g to 500 g, or about 1 g to 400 g, or about 1 g to 300 g, or about 1 g to 200 g, or about 1 g to 100 g, or about 1 g to 80 g, or about 1 g to 60 g, or about 1 g to 40 g, or about 1 g to 20 g, or about 1 g to 10 g, or about 2 g to 1000 g, or about 4 g to 1000 g, or about 6 g to 1000 g, or about 8 g to 1000 g, or about 10 g to 1000 g, or about 2 g to 100 g, or about 4 g to 100 g, or about 6 g to 100 g, or about 8 g to 100 g, or about 10 g to 100 g to the beneficiation slurry. The amount of time required for the gravity separation depends on the amount of gravitational force applied to the beneficiation slurry in addition to ore composition, particle size, and the like. In embodiments, the amount of time required to partition the beneficiation slurry to form a beneficiary and a gangue at 1 g is about 1 second to 7 days; or about 1 second to about 4 days, or about 1 second to 2 days; or about 1 second to 1 day; or about 1 second to 12 hours; or about 1 second to 6 hours; or about 1 second to 3 hours; or about 1 minute to 7 days, or about 5 minutes to 7 days; or about 1 hour to 7 days; or about 3 hours to 7 days; or about 6 hours to 7 days; or about 12 hours to 7 days; or about 1 day to 7 days; or about 1 minute to 1 day, or about 10 minutes to 1 day, or about 30 minutes to 1 day, or about 1 hour to 1 day, or about 1 minute to 12 hours, or about 1 minute to 6 hours, or about 1 minute to 3 hours, or about 10 minutes to 1 day, or about 10 minutes to 12 hours, or about 10 minutes to 6 hours, or about 10 minutes to 3 hours.

Another method of beneficiation employs ambient gravity, that is, 1 g or no applied gravitational force. Such methods include comminution of an ore source, classification of the comminuted ore, forming a slurry of the comminuted ore with water, and applying the slurry to a settling tank or a countercurrent flow to partition the slurry into an underflow and an overflow. The underflow includes an ore particulate having a reduced amount of silica, a reduced amount of kaolinite, an increased total amount of alumina, an increased amount of extractable alumina, an increased alumina/silica ratio, or two or more of these. In embodiments, the overflow includes a reduced size class of particulate termed "superfines", which may be further processed to improve the overall efficiency of countercurrent flow partitioning. In embodiments the underflow is flocculated to reduce water content prior to extractive processing. The underflow, optionally with reduced water content and optionally further combined with one or more additional underflows (e.g. second underflow, third underflow, etc. without limitation), is applied as the starting material in an extractive process.

Accordingly, a method of beneficiation includes comminution of an ore source, followed by classification of the comminuted ore; then combining the classified ore with a water source and a beneficiation agent to form a beneficiation slurry; the beneficiation slurry is partitioned, or separated by a countercurrent flow at 1 g to form a beneficiary and a gangue. Thus, in embodiments, a beneficiation slurry is partitioned into an underflow and an overflow using a countercurrent flow apparatus, wherein the underflow is collected and in embodiments is applied to extractive processing. In embodiments the underflow comprises a beneficiary and the overflow comprises a gangue.

One example of a continuous countercurrent flow process is shown schematically in FIG. 1, wherein arrows represent the flow direction of fluid flows. Tanks 100, 200, 300, 400 are containers that are each adapted to receive an ore slurry and partition or separate the ore slurry into an underflow and an overflow. Tanks 100, 200, 300, 400 are fluidly connected via fluid flow path A in FIG. 1 to collect and transfer overflows 25, 35, 45, 55, collectively $A_o$ and underflows 20, 30, 40, 60, collectively $A_u$. Thus, an ore slurry source 5 is applied to first tank 100 by flow path 10 in fluid communication between source 5 and tank 100. Partitioning inside second tank 100 results in formation of second underflow 30 and second overflow 25 first overflow 55 and first underflow 20. First overflow 55 is collected and/or fluidly transferred for additional processing (not shown). A first underflow 20 is applied to second tank 200; partitioning inside second tank 200 results in formation of second underflow 30 and second overflow 25. Second overflow 25 is reapplied to first tank 100. Second underflow 30 is applied to third tank 300; partitioning inside third tank 300 results in formation of third underflow 40 and third overflow 35. Third overflow 35 is combined with first underflow 20 and reapplied to second tank 200. Third underflow 40 is applied to fourth tank 400; partitioning inside fourth tank 400 results in formation of fourth underflow 50 and fourth overflow 45. Fourth overflow 45 is combined with first underflow 20 and reapplied to second tank 200. Fourth underflow 50 is collected and/or fluidly transferred passed along to a separate process (not shown).

Further in FIG. 1, water source 500 is fluidly connected to fluid flow path A, for example as shown in fluid communication with underflow 40; water source 500 supplies water to the fluid flow path A to maintain a selected fluid viscosity of the fluid in the path, and/or provide suitable ore concentration in the slurry to achieve effective partitioning. In some embodiments, multiple water sources are suitably employed within the fluid flow path for effective separation of overflows and underflows.

In embodiments related to FIG. 1, ore slurry source 5 comprises at least a water source and an ore source. In embodiments, ore slurry source 5 is a bauxite slurry source.

In some embodiments a beneficiation agent, either neat or dissolved in water, is applied to the ore slurry source 5, and the ore slurry source is a beneficiation slurry source. The beneficiation slurry source is transferred via flow path 10 to tank 100. In other embodiments, the ore slurry source 5 is added to tank 100 and a beneficiation agent, either neat or dissolved in water, is applied to tank 100 to form a beneficiation slurry therein. In still other embodiments, ore slurry source 5 is combined with a beneficiation agent by addition of the agent in flow path 10 to form a beneficiation slurry within flow path 10. Suitable addition points for applying one or more water sources and/or beneficiation agents are suitably connected in fluid communication with ore slurry source 5, flow path 10, tank 100, or a combination of two or more thereof, as selected by an operator. Additional mixing equipment, either active (motorized mixing via paddles, blades, screws, kneaders, and the like) or passive (static mixers and related in-flow mixing designs such as corners, weirs and walls, impinging flows, and the like) are suitably positioned proximal to any one or more selected addition points in order to provide suitable mixing of water, beneficiation agent, or a combination thereof to form a beneficiation slurry for partitioning within tank 100.

In similar fashion to the above, one or more water sources, one or more beneficiation agents, or combinations thereof are suitably placed in fluid communication with ore slurry source 5, flow path 10, tank 100, or at any one or more locations along flow path A. In embodiments one or more beneficiation agents, or combinations thereof are suitably placed in fluid communication with overflow path $A_o$. As shown in FIG. 1, one or more beneficiation agents are suitably applied to one or more fluid flows 10, 20, 25, 30, 35, 40, 45; to one or more tanks 100, 200, 300, 400; to water source 500; or to two or more of these. Mixing equipment, either active (motorized mixing via paddles, blades, screws, kneaders, and the like) or passive (static mixers and related in-flow mixing designs such as baffles, weirs, impinging flows, and the like) are suitably positioned proximal to any one or more selected fluid communication locations in order to provide suitable mixing of water, mixing of beneficiation agent, mixing of water and beneficiation agent, or mixing or of beneficiation agent and water with a fluid in one or more fluid flow paths, tanks, or combination thereof.

In embodiments, a beneficiation agent comprises, consists essentially of, or consists of cationic polymer. In embodiments, a beneficiation agent comprises, consists essentially of, or consists of a polysaccharide. In embodiments, a beneficiation agent comprises, consists essentially of, or consists of a cationic polymer combined with a polysaccharide. In such embodiments, the cationic polymer is combined with the polysaccharide before or after applying to an ore source or ore slurry.

In embodiments, tanks 100, 200, 300, 400 are sedimentation tanks or settling tanks, wherein a gravitational force of 1 g achieves partitioning therein. In other embodiments, tanks 100, 200, 300, 400 are hydrocyclones or centrifuges, wherein a gravitational force of greater than 1 g is applied to achieve partitioning therein. In still other embodiments, a combination of methods are suitably employed by an operator, such as a combination of hydrocyclones and settling tanks; additionally, any number of tanks and flow paths are suitably added within the process of FIG. 1 as shown; for example, 10 tanks or more may be suitably selected by an operator based on the requirements of a particular field location and/or properties of the ore source selected for beneficiation.

It is a feature of the compositions and methods disclosed herein that presently employed industrial processing equipment is modified with ease to add or apply one or more beneficiation agents thereto. It is not necessary to redesign or reconfigure ore beneficiation equipment and flow paths already in place in many industrial mining product processing plants in order to achieve the results reported herein. Additionally, the amount and type of beneficiation agent is easily varied within one or more flow paths to address the fluid flow at the selected addition point. The presently disclosed methods and compositions are easily adapted for use in industrial ore processing equipment already widely employed in the industry. Further, the process represented schematically in FIG. 1 is suitably adapted for continuous or batch beneficiation as selected by an operator.

In embodiments related to FIG. 1, an underflow 50 is a beneficiary. In other embodiments, the beneficiary is an underflow obtained by a modified version of FIG. 1 as discussed above. The beneficiary is enriched in alumina species compared to the corresponding "as-mined" bauxite ore, comminuted bauxite ore, or classified bauxite ore. Compared to a bauxite ore source, the beneficiary ore includes at least one of: an increased total alumina:total silica ratio, an increased available alumina:total silica ratio, an increased available alumina:kaolinite ratio, a reduced weight percent of kaolinite, a reduced weight percent of total silica, an increased weight percent of total alumina, or an increased weight percent of available alumina. Compared to the solids of an ore source subjected to the methods recited herein but without addition of a beneficiation agent, the beneficiary solids include at least one of: an increased total alumina:total silica ratio, an increased available alumina:total silica ratio, an increased available alumina:kaolinite ratio, a reduced weight percent of kaolinite, a reduced weight percent of total silica, an increased weight percent of total alumina, or an increased weight percent of available alumina.

In embodiments, one or more beneficiaries are collected. In embodiments, one or more beneficiaries are flocculated using an anionic flocculant. In embodiments, the flocculant is a conventional flocculant polymer or blend thereof used in the mining industry as a flocculant in one or more beneficiation, extraction, or other process. Conventional flocculants include anionic copolymers of acrylamide with 2-acrylamido-2-methylpropane sulfonic acid, acrylic acid, or both. The methods of beneficiation described herein, in particular where silicic species are reduced by the beneficiation, provide additional benefit during subsequent processing such as extraction and flocculation due to the improved properties of the beneficiary. For example, in embodiments, a reduced concentration of silicic species in a beneficiary leads to improved yield of alumina obtained from subsequent bauxite extraction, increased selectivity in a subsequent flocculation step, or both.

In embodiments, one or more beneficiaries are dried after collecting to reduce water content using evaporative methods such as heating, venting, flowing a gas such as air or nitrogen around or across the beneficiary, or a combination thereof. Drying is suitably carried out with or without flocculating prior to drying. In embodiments, one or more beneficiaries are applied as the starting material in an extractive process. In some such embodiments the extractive process is a Bayer process.

In embodiments, an overflow includes a reduced size class of particulate termed "superfines". The reduced size class of "superfine" particulates is not limited, but includes an average particle size range that is statistically lower than the average particle size of "fines" as determined by an industry accepted measurement. The relative size regimes of particulates is determined by the specific processes and equipment employed in an actual pre-Bayer processing plant.

A beneficiation agent comprising, consisting essentially of, or consisting of a cationic polymer provides one or more additional unexpected benefits in one or more beneficiation methods described herein. A beneficiation agent comprising a cationic polymer and excluding polysaccharide provides unexpected benefits in one or more beneficiation methods described herein. A beneficiation agent comprising, consisting essentially of, or consisting of a polysaccharide provides one or more additional unexpected benefits in one or more beneficiation methods described herein. A beneficiation agent comprising a polysaccharide and excluding cationic polymer provides unexpected benefits in one or more beneficiation methods described herein. A beneficiation agent comprising, consisting essentially of, or consisting of DADMAC provides one or more additional unexpected benefits in one or more beneficiation methods described herein. A beneficiation agent comprising, consisting essentially of, or consisting of chitosan provides one or more additional unexpected benefits in one or more beneficiation methods described herein. A beneficiation agent comprising, consisting essentially of, or consisting of DADMAC combined with dextran or chitosan provides one or more additional unexpected benefits in one or more beneficiation methods described herein.

In embodiments, the beneficiary obtained by gravity separation of a beneficiation slurry includes one or more of the following advantages, which are unexpected over the known art of pre-extraction processing. Prior to the disclosures herein, it was not understood that gravitational force applied to separation of bauxite ores prior to extractive processing could be affected by a chemical treatment. Specifically, it was not previously known prior to this disclosure that a cationic polymer or a cationic polymer combined with a polysaccharide, would improve the pre-extraction composition of a bauxite ore. Thus, the discovery that these agents work as reported is completely unexpected to one of skill in the art of bauxite ore processing, in particular pre-extraction processing of bauxite ores, and even more particularly pre-extraction processing of bauxite ores of "low quality", where low quality means less than about 40% by weight of alumina, more than about 3 wt % kaolinite, or both.

One important measure of beneficiary quality is the total alumina:total silica weight ratio, wherein the total weight of alumina ($Al_2O_3$) is measured relative to the total weight of silica ($SiO_2$). This ratio is representative of the overall quality of the bauxite ore to be delivered to an extraction process. Since the extraction is intended to chemically liberate aluminum species from the rock matrix in which the species are naturally encased (that is, the ore), increasing the ratio of alumina to silica in a beneficiary increases the efficiency of the subsequent extractive process. In some embodiments, a beneficiary according to the presently described processes includes a weight ratio of total alumina:total silica that is greater than the weight ratio of total alumina:total silica in a partitioned ore slurry after gravitational separation in the absence of the beneficiation agent.

The presently described gravitational partitioning methods and beneficiation agents result in an overall increase of the total alumina:total silica ratio over conventional centrifugal partitioning methods known to those of skill in pre-extractive bauxite ore processing. In embodiments, a beneficiary obtained according to the presently described separation processes includes at least 1 wt % and as much as 90 wt % more total alumina than the ore slurry prior to partitioning, for example about 1 wt % to 80 wt %, or about 1 wt % to 70 wt %, or about 1 wt % to 60 wt %, or about 1 wt % to 50 wt %, or about 1 wt % to 40 wt %, or about 1 wt % to 30 wt %, or about 1 wt % to 25 wt %, or about 1 wt % to 20 wt %, or about 1 wt % to 15 wt %, or about 3 wt % to 90 wt %, or about 5 wt % to 90 wt %, or about 10 wt % to 90 wt %, or about 20 wt % to 90 wt %, or about 3 wt % to 70 wt %, or about 5 wt % to 50 wt %, or about 5 wt % to 25 wt % more total alumina than the ore slurry prior to partitioning.

Another important measure of beneficiary quality is weight percent of "reactive silica" or kaolinite in the beneficiary. Kaolinite is one silica species; a second common silica impurity that is less reactive than kaolinite is quartz. However, as mentioned above, kaolinite in particular is reactive with the caustic introduced in the Bayer process (an example of a chemical process for alumina extraction), so eliminating as much kaolinite as possible prior to Bayer processing of a beneficiary provides a greater benefit than simply decreasing silica content overall (and thereby increasing alumina:silica ratio). The reduced kaolinite content also reduces the amount of Bayer caustic reagent required and therefore also the overall cost of Bayer processing. In some embodiments, a beneficiary according to the presently described processes includes about 1 wt % to 25 wt % less kaolinite than the corresponding ore slurry prior to partitioning, for example about 1 wt % to 20 wt % less, or 1 wt % to 15 wt % less, or 1 wt % to 10 wt % less, or about 1 wt % to 9 wt % less, or about 1 wt % to 8 wt % less, or about 1 wt % to 7 wt % less, or about 1 wt % to 6 wt % less, or about 1 wt % to 5 wt % less, or about 1 wt % to 4 wt % less, or about 1 wt % to 3 wt % less, or about 1 wt % to 2 wt % less, or about 2 wt % to 9 wt % less, or about 2 wt % to 8 wt % less, or about 2 wt % to 7 wt % less, or about 2 wt % to 6 wt % less, or about 2 wt % to 5 wt % less, or about 2 wt % to 4 wt % less, or about 2 wt % to 3 wt % less than the ore slurry prior to partitioning.

Yet another important measure of beneficiary quality is weight percent of "extractable" or "available" alumina in the beneficiary. Extractable or available alumina is the theoretical yield of alumina available from the planned extractive process, and is different from total alumina because in embodiments, not all alumina species are extracted by an extraction process. In some embodiments, the extractive process is a Bayer process and a beneficiary obtained according to the presently described gravity separation processes includes at least 1 wt % and as much as 50 wt % more extractable alumina than the ore slurry prior to partitioning, for example about 1 wt % to 45 wt %, or about 1 wt % to 40 wt %, or about 1 wt % to 35 wt %, or about 1 wt % to 30 wt %, or about 1 wt % to 25 wt %, or about 1 wt % to 20 wt %, or about 1 wt % to 15 wt %, or about 3 wt % to 15 wt %, or about 3 wt % to 10 wt %, or about 3 wt % to 8 wt %, or about 3 wt % to 6 wt %, or about 4 wt % to 8 wt %, or about 5 wt % to 10 wt %, or about 5 wt % to 8 wt %, more extractable alumina than the ore slurry prior to partitioning.

EXPERIMENTAL SECTION

Examples 1-9

We determined that a bauxite ore processing plant employing hydrocyclones to partition bauxite slurries partition the applied mass at a ratio of about 50% overflow to 50% underflow, while the volume partitioning is about 80% in the overflow to 20% in the underflow. We have found dynamic distribution of these parameters in a hydrocyclone may be mimicked using a static centrifuge method by applying 80 g of force for 60 seconds to a slurry in a centrifuge tube, then removing about 80% of the volume of the contents of the centrifuge tube by suctioning supernatant liquid from the top of the centrifuge tube using a syringe. The supernatant removed is representative of the hydrocyclone "overflow", or gangue, while the remainder is representative of the "underflow", or beneficiary, obtained from a hydrocyclone. The portion of the contents remaining in the tube after supernatant removal is flocculated to reduce water content, and the flocculated material is collected, dried at 120° C. for 8-16 hours, or 90° C. for 16-24 hours, then analyzed for alumina and silica content using x-ray fluorescence.

An ore slurry comprising bauxite fines was obtained from a bauxite mine. The ore slurry was about 10% solids as received. To obtain a control measurement, 8 samples were centrifuged as described above without further modification. After centrifugation, each underflow was collected, flocculated, and dried as described above. An average of measurements of the 8 centrifuged, collected, flocculated, and dried underflow samples provided a baseline measurement of the benefits of beneficiation by centrifugal force alone. The average of these measurements provided baseline measurement of about 47 wt % of total alumina and about 14.2 wt % total silica, resulting in an alumina:silica weight ratio of 3.3.

To test beneficiation agents, vortex mixing was applied to 45 mL of the ore slurry for about 30 seconds, then the mixing was paused; the beneficiation agent was added in a selected amount, mixed thoroughly using the vortex mixer, then 80 G was applied to the resulting mixture in a centrifuge for approximately 60 seconds, then the supernatant was removed and the beneficiary was flocculated and dried as described above and tested for alumina and silica content. Where an addition included more than one agent, the agents were premixed and added contemporaneously. The additions were carried out by applying the agents as received, wherein amount added was calculated based on e.g. percent solids provided in a solution where applicable.

Intrinsic viscosity of the DADMAC homopolymer in water was found to be 0.35 to 0.55 dl/g, with a bulk viscosity of less than 3200 cP at 35-39% weight percent (water as solvent), corresponding to a molecular weight of about $1.7 \times 10^5$ g/mol. The dextran used has a reported weight average molecular weight of 40,000 g/mol. A sulfonated acrylate copolymer, FREEVIS® 903, was obtained from Nalco Company of Naperville, Ill. and used as-is. Total alumina and total silica were determined by X-ray fluorescence.

Results of testing various beneficiation agents relative to the Control (no beneficiation agent) are shown in Table 1. The reported numbers show that both DADMAC, and DADMAC combined with dextran (whether or not the dextran is crosslinked) produce a significant increase in percent alumina, decrease in silica, and increase in overall alumina:silica ratio.

TABLE 1

Beneficiation agent and weight percent of the agent added to an ore slurry; total alumina, total silica, and alumina:silica ratio of the resulting beneficiaries treated according to the procedures listed above, and normalized to the control results (no beneficiation agent).

| Example # | Compound 1 | Compound 2 | Compound 1, g/ton | Compound 2, g/ton | Total Alumina (%) | Total Silica (%) | Al/Si (%) | Total Alumina (% vs blank) | Total Silica (% vs blank) | Al/Si (% vs blank) |
|---|---|---|---|---|---|---|---|---|---|---|
| Control | none | none | 0 | 0 | 46.07 | 15.06 | 3.06 | 0.00 | 0.00 | 0.00 |
| 1 | DADMAC | none | 175 | 0 | 48.60 | 11.14 | 4.36 | 2.53 | −3.92 | 1.30 |
| 2 | Dextran | none | 35 | 0 | 47.64 | 14.15 | 3.37 | 1.57 | −0.91 | 0.31 |
| 3 | X-link Dextran | none | 50 | 0 | 46.59 | 14.26 | 3.27 | 0.52 | −0.80 | 0.21 |
| 4 | DADMAC | Dextran | 35 | 35 | 46.67 | 14.24 | 3.28 | 0.60 | −0.82 | 0.22 |
| 5 | DADMAC | Dextran | 140 | 35 | 48.47 | 10.93 | 4.43 | 2.40 | −4.13 | 1.38 |
| 6 | DADMAC | X-link Dextran | 140 | 50 | 48.57 | 10.88 | 4.46 | 2.50 | −4.18 | 1.41 |
| 7 | FREEVIS ® 903 | none | 175 | 0 | 47.27 | 14.24 | 3.32 | 1.20 | −0.82 | 0.26 |
| 8 | DADMAC | FREEVIS ® 903 | 140 | 175 | 46.47 | 14.10 | 3.30 | 0.40 | −0.96 | 0.24 |
| 9 | DADMAC | FREEVIS ® 903 | 35 | 175 | 45.60 | 15.38 | 2.96 | −0.47 | 0.32 | −0.09 |

Examples 10-17

An additional set of experiments was conducted according to the procedure of Examples 1-9, but with a different batch of ore slurry. Available alumina and kaolinite were measured instead of total alumina and total silica. The amount of available alumina is determined by caustic digestion followed by titration. The amount of total silica and also the amount of kaolinite is determined by X-ray fluorescence.

Results are shown in Table 2. The reported numbers show that both DADMAC, and DADMAC combined with dextran (whether or not the dextran is crosslinked) produce a significant increase in percent available alumina, decrease in kaolinite, and alumina:silica ratio.

TABLE 2

Beneficiation agent and weight percent of the agent added; weight percent of available alumina and kaolinite in the resulting beneficiaries treated according to the procedures listed above.

| Example # | Compound 1 | Compound 2 | Compound 1, g/ton | Compound 2, g/ton | Available Alumina (%) | Kaolinite (%) | Al/Si (%) | Available Alumina (% vs blank) | Kaolinite (% vs blank) | Al/Si (% vs blank) |
|---|---|---|---|---|---|---|---|---|---|---|
| Control 2 | none | none | 0 | 0 | 32.99 | 11.31 | 2.92 | 0.00 | 0.00 | 0.00 |
| 10 | DADMAC | none | 175 | 0 | 39.07 | 7.54 | 5.18 | 6.08 | −3.77 | 2.27 |
| 11 | Dextran | none | 35 | 0 | 34.07 | 10.72 | 3.18 | 1.08 | −0.59 | 0.26 |
| 12 | X-link Dextran | none | 50 | 0 | 33.98 | 11.01 | 3.09 | 0.99 | −0.30 | 0.17 |
| 13 | DADMAC | Dextran | 35 | 35 | 36.35 | 9.36 | 3.88 | 3.36 | −1.95 | 0.97 |
| 14 | DADMAC | Dextran | 157.5 | 7 | 40.39 | 7.19 | 5.62 | 7.40 | −4.12 | 2.70 |
| 15 | DADMAC | X-link Dextran | 157.5 | 10 | 40.97 | 7.49 | 5.47 | 7.98 | −3.82 | 2.55 |
| 16 | FREEVIS ® 903 | none | 175 | 0 | 34.69 | 10.66 | 3.25 | 1.70 | −0.65 | 0.34 |
| 17 | DADMAC | FREEVIS ® 903 | 140 | 175 | 34.84 | 9.80 | 3.56 | 1.85 | −1.51 | 0.64 |

Example 18

The centrifugation procedure of Examples 1-9 was repeated, except that three "control" tubes including no DADMAC were centrifuged; then each of the three "underflows" or pellets were collected and combined, and each of the three "overflows" were also collected and combined. The combined underflows and pellets were separately applied to a standard Anton Paar concentric cylinder apparatus and a shear sweep conducted using an Anton Paar vane spindle, 23° C.-25° C., logarithmic sweep of 0.01 to 100 1/s, interval duration of 526.919 s and averaging over exactly 10% relative point duration. Stress was recorded during the sweep.

The above procedure was repeated except that a DADMAC homopolymer used in Example 1 was added to each of the three tubes of ore slurry in an amount corresponding to 100 g DADMAC per ton of ore (about 0.1 g per kg ore).

The three DADMAC-containing tubes were centrifuged. The overflow and underflow were collected and combined as described for the control slurry above, and the combined overflows and underflows subjected to a shear sweep as described above, wherein the rheology of the combined underflows were compared to that of the "control" combined underflows, and the rheology of the combined overflows were compared to that of the "control" combined overflows.

Figure 2:
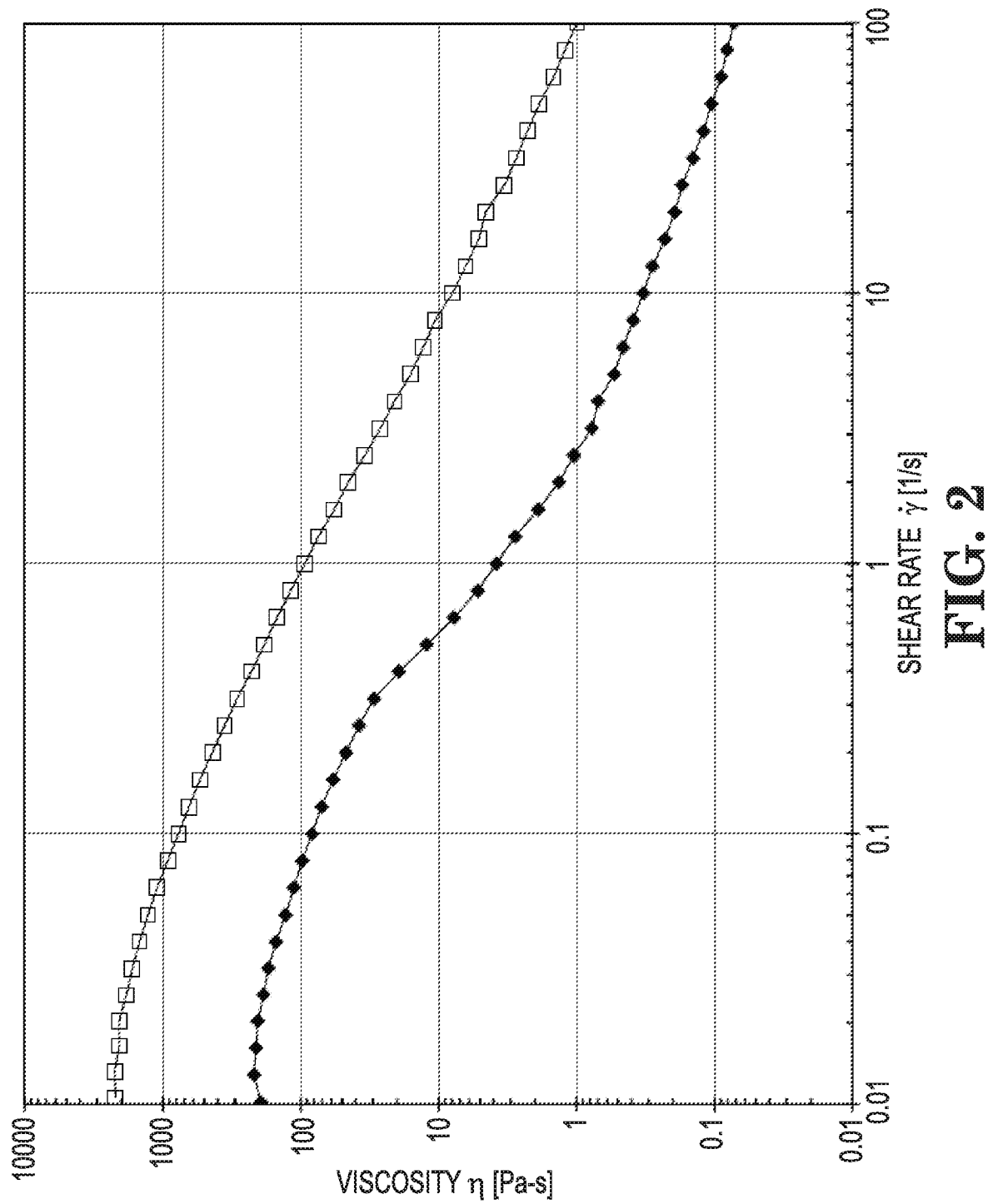
FIG. 2 is a plot of viscosity as a function of shear rate for an underflow formed using the methods described herein.

A plot showing viscosity as a function of shear rate for the combined underflows is shown in FIG. 2, wherein empty squares (□) represent results obtained for the control combined underflow and black diamonds (♦) represent results obtained for the combined underflow wherein 0.1 g DADMAC per kg was added prior to separation of each overflow from each underflow prior to combining the underflows.

Figure 3:
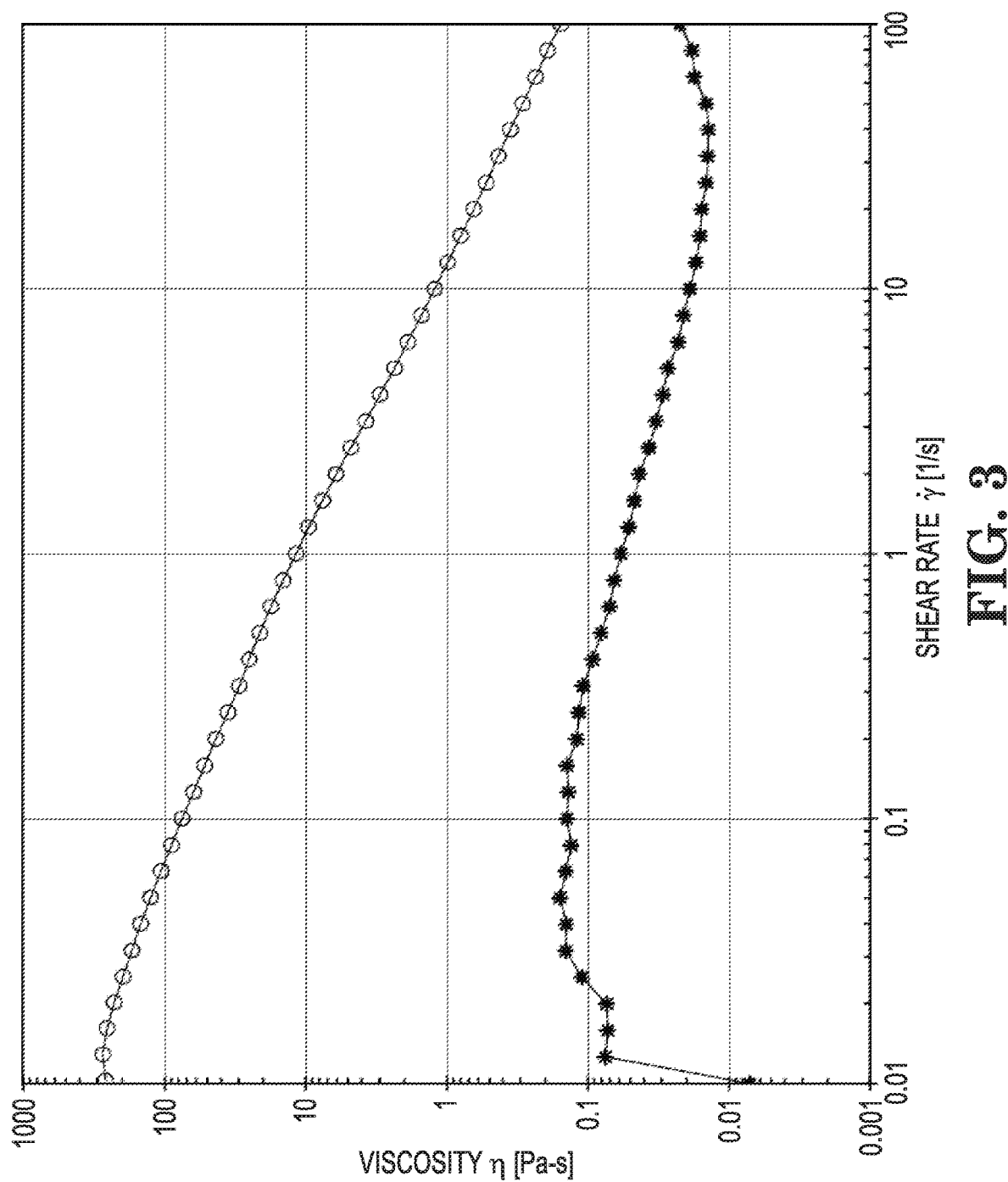
FIG. 3 is a plot of is a plot of viscosity as a function of shear rate for an overflow formed using the methods described herein.

A plot showing viscosity as a function of shear rate for the combined overflows is shown in FIG. 3, wherein empty circles (○) represent results obtained for the control combined underflow and asterisks (*) represent results obtained for the combined overflow wherein 0.1 g DADMAC per kg was added prior to separation of each overflow from each underflow prior to combining the overflows.

As can be seen in FIGS. 2 and 3, the addition of DADMAC homopolymer strongly affects the viscosity of the separated flows, lowering the viscosity at all shear rates and for all flows.

Examples 19-37

The procedure of Examples 1-9 was repeated using different beneficiation agents as shown in Table 3, and the results show the benefits of beneficiation compared to a Control (beneficiation without using a beneficiation agent). Beneficiation agents include the following listed materials, alone or in combined as set forth in Table 3.

DADMAC Homopolymers: Low MW: IV=<0.3 dl/g; Med. Low MW: IV=0.35 to 0.55 dl/g; Med. High MW: IV=0.500-0.900 dl/g; High MW, IV=0.900-1.300 dl/g 90 DADMAC/10 AA, copolymer of 90 mole % DADMAC, 10 mole % acrylic acid, IV=0.890-1.310 dl/g 70 DMAEA-MCQ/30 AA: copolymer of 70 mole % 2-(acryloyloxy)ethyltrimethylammonium chloride or 2-(methacryloyloxy)ethyltrimethylammonium chloride; and 30 mole % acrylic acid, IV=1.000-1.500 dl/g Epi-DMA: polymerized epichlorohydrin post-reacted (quaternized) with both dimethylamine and ammonia, IV=0.150-0.290 dl/g xEpi-DMA, polymerized epichlorohydrin post-reacted (quaternized) with both dimethylamine and ammonia, IV=0.080-0.140 dl/g; and crosslinked with $NH_3$.

Chitosan: 3% chitosan dissolved in 1% acetic acid, obtained from Tidal Vision.

Carrageenan: GELACARIN® GP 812 NF, purchased from FMC BioPolymer

Cationic starch: DWT-5100 xEpi-DMA obtained from Dober Chemical.

Dextran: reported weight average molecular weight of 40,000 g/mol.

TABLE 3

Beneficiation agent and weight percent of the agent added; weight percent of available alumina and silica in the resulting beneficiaries treated according to the procedures listed above.

| Ex. No. | Compound 1 | Compound 2 | Compound 1, g/ton | Compound 2, g/ton | Total Alumina (%) | Total Silica (%) | Al/Si (%) | Total Alumina, % vs. blank | Total Silica, % vs. blank | Al/Si, % vs. blank |
|---|---|---|---|---|---|---|---|---|---|---|
| Control 3 | none | none | 0 | 0 | 42.66 | 20.23 | 2.11 | 22.43 | 18.12 | 1.00 |
| 19 | Med. Low MW DADMAC | none | 50 | 0 | 46.48 | 15.62 | 2.98 | 26.25 | 13.51 | 1.41 |
| 20 | Med. Low MW DADMAC | none | 370 | 0 | 44.11 | 18.10 | 2.44 | 23.88 | 15.99 | 0.82 |
| 21 | 90 DADMAC/10 AA | none | 200 | 0 | 43.79 | 18.56 | 2.36 | 23.56 | 16.45 | 0.97 |
| 22 | 70 DMAEA.MCQ/30 AA | none | 250 | 0 | 43.97 | 18.92 | 2.32 | 23.74 | 16.81 | 0.98 |
| 23 | Low MW DADMAC | none | 300 | 0 | 46.37 | 15.98 | 2.90 | 26.14 | 13.87 | 1.25 |
| 24 | Med. Low MW DADMAC | none | 200 | 0 | 45.85 | 16.64 | 2.75 | 25.62 | 14.54 | 0.95 |
| 25 | Chitosan | none | 300 | 0 | 45.38 | 16.72 | 2.71 | 25.15 | 14.62 | 0.99 |
| 26 | Epi-DMA | none | 550 | 0 | 45.81 | 16.30 | 2.81 | 25.58 | 14.19 | 1.04 |
| 27 | Med. High MW DADMAC | none | 200 | 0 | 45.81 | 19.00 | 2.41 | 25.58 | 16.89 | 0.86 |
| 28 | xEpi-DMA | none | 450 | 0 | 46.00 | 16.00 | 2.88 | 25.77 | 13.89 | 1.19 |
| 29 | High MW DADMAC | none | 180 | 0 | 43.20 | 19.27 | 2.24 | 22.97 | 17.16 | 0.78 |
| 30 | Chitosan | none | 150 | 0 | 44.20 | 18.03 | 2.45 | 23.97 | 15.92 | 1.09 |
| 31 | Chitosan | none | 75 | 0 | 43.82 | 18.84 | 2.33 | 23.59 | 16.74 | 0.95 |
| 32 | 90 DADMAC/10 AA | none | 50 | 0 | 42.96 | 19.11 | 2.25 | 22.73 | 17.00 | 0.97 |
| 33 | 90 DADMAC/10 AA | none | 100 | 0 | 43.63 | 19.33 | 2.26 | 23.40 | 17.22 | 1.00 |
| 34 | Med. Low MW DADMAC | carrageenan | 100 | 2.5 | 44.84 | 18.18 | 2.47 | 24.61 | 16.07 | 1.09 |
| 35 | Med. Low MW DADMAC | Cationic Starch | 100 | 25 | 45.59 | 16.57 | 2.75 | 25.36 | 14.46 | 1.12 |
| 36 | Med. Low MW DADMAC | Dextran | 100 | 17.5 | 44.98 | 16.87 | 2.67 | 24.75 | 14.76 | 0.97 |
| 37 | Med. Low MW DADMAC | Chitosan | 50 | 150 | 45.76 | 16.37 | 2.79 | 25.53 | 14.27 | 1.05 |

Example 38

The procedure of Example 18 was repeated using 150 g per ton of a 50/50 mole/mole copolymer of DMAEA-MCQ and acrylic acid having IV=1.0-1.5 dl/g. Thus, the polymer is an ionic polymer with a net charge of zero. Total alumina, total silica, and Al/Si ratio in the resulting beneficiary were about the same as for Control 3, listed in Table 3: that is, no benefit was obtained employing a an ionic polymer having net charge of zero.

Example 39

The procedure of Example 18 was repeated using 160 g per ton of a copolymer of 30 mole % sodium methacrylate and 70 mol % sodium 2-acrylamido-2-methylpropane sulfonate having IV=2 dl/g. The polymer is an ionic polymer with a net charge of less than −1. Total alumina, total silica, and Al/Si ratio in the resulting beneficiary were about the same as for Control 3, listed in Table 3: that is, no benefit was obtained employing an anionic polymer (ionic polymer having net charge of less than −1).

Example 40

A process was devised to model the results obtained by partitioning a bauxite ore using a series of 4 tanks at 1 g, further wherein a countercurrent flow path is provided that is similar to flow path A of FIG. 1. The model process is as follows, wherein it is important to conduct each of the steps in the recited order, to test each new beneficiation agent.

Fill a first 500 ml beaker with an ore slurry. Add approximately 110 g beneficiation agent per ton of ore solids in the slurry and mix for 1 minute with a spatula. Allow the contents of the beaker to settle for 5 minutes. Then decant approximately 350 ml fluid into a second 500 ml beaker. Add approximately 150 ml of deionized water to the first beaker, add an additional 100 g/ton of beneficiation agent per ton of ore solids in the slurry and mix for 1 minute with a spatula. Allow the contents of the beaker to settle for 5 minutes. In the second beaker add another 37 g/ton of beneficiation agent per ton of ore solids in the slurry and sufficient deionized water to reach 500 ml; mix for 5 minutes with a spatula, then allow to settle for 5 minutes. Decant approximately 350 ml from the second beaker into a third 500 ml beaker, then fill the third beaker to 500 ml with deionized water. Decant 350 ml from the first beaker into second beaker. Fill the first beaker to 500 ml with deionized water. Add 37 g/ton of beneficiation agent per ton of ore solids in the slurry to each beaker and again mix all beakers with spatula for one minute. Allow all beakers to settle for 5 minutes. Decant approximately 350 ml from the third beaker into a fourth, 500 ml beaker and add 150 ml deionized water. Decant 350 ml from the second beaker into third beaker; and decant 350 ml from the first beaker into the second beaker. Add 150 ml of deionized water to the first beaker. Add 18 g/ton of beneficiation agent per ton of ore solids in the slurry to each beaker, mix with spatula for 1 minute, and allow to settle for 5 minutes.

After the foregoing is completed, the following process is repeated five (5) times, further wherein each repeat is carried out in the order recited: decant about 425 ml from the fourth beaker and place into an empty one liter beaker; decant about 425 ml from the third beaker and place into the fourth beaker; decant about 425 ml from the second beaker and place into the third beaker; decant about 425 ml from the first beaker and add into the second beaker; add 425 ml deionized water to the first beaker; add 18 g/ton of beneficiation agent per ton of ore solids in the slurry to the first beaker; mix the contents of all 500 ml with a spatula for one minute; allow beaker contents to settle for five minutes before repeating. Then carry out the following process, in order:

After the foregoing is completed, the following process is carried out in the recited order: decant as much of the liquid as possible from the fourth beaker, then add the residual content of the fourth beaker into the third beaker. Mix the third beaker contents for one minute with spatula and allow to settle for 5 minutes. Then decant as much of the liquid as possible from the third beaker, then add the residual content of the third beaker into the second beaker. Mix the second beaker contents for one minute with spatula and allow to settle for 5 minutes. Then decant as much of the liquid as possible from the second beaker, then add the residual content of the second beaker into the first beaker. Mix the first beaker contents for one minute with spatula and allow to settle for 5 minutes. Decant as much of the liquid as possible from the first beaker. The first beaker will contain chemically washed ore.

After the foregoing steps are complete, dry the contents of the first beaker in an oven and subject the dry contents to XRF analysis to determine content of alumina, silica, or both.

Employing the above procedure and starting with the same ore slurry as employed to obtain Control 3 (Table 3 above), and Med. Low MW DADMAC as the beneficiation agent, total alumina in the beneficiary was found to be 54.54%, total silica was 5.57%, and Al/Si % ratio of 9.97.

What is claimed is:

1. A method of pre-extractive processing of a bauxite ore, the method comprising: combining a bauxite ore source with a water source and a beneficiation agent to form first beneficiation slurry, wherein the combining is prior to extractive processing of the ore source; and partitioning first beneficiation slurry into a first beneficiary and a first gangue, wherein the beneficiation agent comprises a cationic polymer, a polysaccharide, or a combination thereof.

2. The method of claim 1 wherein the cationic polymer comprises a DADMAC polymer, a DADMAC copolymer, or a combination of two or more thereof.

3. The method of claim 1 wherein the polysaccharide comprises dextran or chitosan.

4. The method of claim 1 wherein the bauxite ore source is a comminuted ore source or a classified ore source.

5. The method of claim 1 further comprising collecting the first beneficiary, followed by one or more of: flocculating the first beneficiary, dewatering the first beneficiary, and drying the first beneficiary.

6. The method of claim 1 wherein the first beneficiary comprises about 1 wt % to 90 wt % more total alumina than a product obtained using the same methodology but in the absence of the beneficiation agent.

7. The method of claim 1 wherein the first beneficiary comprises about 1 wt % to 50 wt % more extractable alumina than a product obtained using the same methodology but in the absence of the beneficiation agent.

8. The method of claim 1 wherein the first beneficiary comprises about 1 wt % to 25 wt % less kaolinite than a product obtained using the same methodology but in the absence of the beneficiation agent.

9. The method of claim 1 wherein the partitioning is accomplished by applying a central force to the beneficiation slurry.

10. The method of claim 1 wherein the partitioning is accomplished by applying the beneficiation slurry to a countercurrent flow.

11. The method of claim 10 wherein the method further comprises applying the first gangue to a second partitioning to obtain a second beneficiary and a second gangue.

12. The method of claim 11 wherein the second beneficiary is combined with the first beneficiary.

13. The method of claim 1 wherein the beneficiation agent is added in amount corresponding to about 0.01 gram to 10 gram beneficiation agent per kg of the ore source.

14. The method of claim 1 the ore source comprises less than 40 wt % extractable alumina.

15. The method of claim 1 wherein the ore source comprises more than 3 wt % kaolinite.

16. The method of claim 1 wherein the first beneficiary is applied to a Bayer process.

17. A pre-extractive beneficiation composition comprising
   a bauxite ore source prior to alumina extraction,
   water, and
   about 0.01 gram to 10 gram beneficiation agent per kg of the ore source, the beneficiation agent comprising a cationic polymer, a polysaccharide, or a combination thereof.

18. The composition of claim 17 wherein the beneficiation agent consists essentially of a DADMAC homopolymer.

19. The composition of claim 17 wherein the beneficiation agent consists essentially of chitosan.

20. The composition of claim 17 wherein the beneficiation agent is a combination of a DADMAC homopolymer and a dextran.

* * * * *